(12) United States Patent
Bourgoine et al.

(10) Patent No.: US 10,536,052 B2
(45) Date of Patent: Jan. 14, 2020

(54) ACTUATOR FOR CHOKE VALVE

(71) Applicant: Tol-O-Matic, Inc., Hamel, MN (US)

(72) Inventors: Ryan Bourgoine, Buffalo, MN (US); Igor Glikin, Plymouth, MN (US); Jeremy Forbord, Mound, MN (US); Gary W. Rosengren, Brooklyn Park, MN (US); Lucas Keranen, Orono, MN (US)

(73) Assignee: Tolomatic, Inc., Hamel, MN (US)

( * ) Notice: Subject to any disclaimer, the term of this patent is extended or adjusted under 35 U.S.C. 154(b) by 438 days.

(21) Appl. No.: 15/183,430

(22) Filed: Jun. 15, 2016

(65) Prior Publication Data
US 2016/0372989 A1 Dec. 22, 2016

Related U.S. Application Data

(60) Provisional application No. 62/180,411, filed on Jun. 16, 2015.

(51) Int. Cl.
*H02K 7/06* (2006.01)
*H02K 7/116* (2006.01)
(Continued)

(52) U.S. Cl.
CPC ............... *H02K 7/06* (2013.01); *H02K 7/003* (2013.01); *H02K 7/102* (2013.01); *H02K 7/116* (2013.01); *H02K 11/21* (2016.01)

(58) Field of Classification Search
CPC .......... H02K 7/06; H02K 11/21; H02K 7/003; H02K 7/102; H02K 7/116; H02K 7/21
(Continued)

(56) References Cited

U.S. PATENT DOCUMENTS 3,348,082 A * 10/1967 Martin .................... H02K 5/10
310/85
4,227,104 A * 10/1980 Hamman ................ F16C 35/02
310/75 R
(Continued)

FOREIGN PATENT DOCUMENTS

JP 2006214560 A 8/2006
WO WO 2004/057205 A2 7/2004
WO WO 2009/146737 A1 12/2009

OTHER PUBLICATIONS

Search Report and Written Opinion dated Oct. 6, 2016 for PCT Application No. PCT/US2016/037759, 15 pages.
(Continued)

*Primary Examiner* — Mang Tin Bik Lian
*Assistant Examiner* — Maged M Almawri
(74) *Attorney, Agent, or Firm* — Patterson Thuente Pedersen, P.A.

(57) ABSTRACT

A compact, axially aligned brushless servo motor actuation unit configured to manipulate a choke valve to control the pressure within a borehole during managed pressure drilling. The actuation unit including a brushless servo, a gear reduction assembly and a planetary roller actuator substantially aligned along a longitudinal axis and housed within a tubular housing, the gear reduction assembly defining a hollow core sized to enable a portion of a roller screw of the planetary roller actuator to pass therethrough for the purpose of reducing the overall length of the actuation unit along the longitudinal axis.

20 Claims, 8 Drawing Sheets

(51) Int. Cl.
*H02K 7/102* (2006.01)
*H02K 7/00* (2006.01)
*H02K 11/21* (2016.01)

(58) Field of Classification Search
USPC .......................................... 310/68 B, 12, 89
See application file for complete search history.

(56) References Cited

U.S. PATENT DOCUMENTS

| | | | | |
|---|---|---|---|---|
| 4,463,291 | A * | 7/1984 | Usry | G05D 3/18 310/83 |
| 4,920,811 | A | 5/1990 | Hopper | |
| 5,009,554 | A | 4/1991 | Kameyama et al. | |
| 5,673,593 | A * | 10/1997 | Lafferty | F16H 25/2015 192/141 |
| 6,242,824 | B1 * | 6/2001 | Torii | H02K 7/112 29/596 |
| 6,691,587 | B1 | 2/2004 | King | |
| 8,851,451 | B2 * | 10/2014 | Orino | C10B 25/10 137/553 |
| 9,388,342 | B2 * | 7/2016 | Orino | C10B 25/10 |
| 9,816,592 | B1 | 11/2017 | Glikin et al. | |
| 2005/0218727 | A1 | 10/2005 | Gandel et al. | |
| 2006/0081398 | A1 | 4/2006 | Arian et al. | |
| 2008/0084131 | A1 * | 4/2008 | Yamawaki | H02K 5/08 310/89 |
| 2009/0227415 | A1 | 9/2009 | Bueina | |
| 2011/0036560 | A1 * | 2/2011 | Vail, III | E21B 28/00 166/87.1 |
| 2013/0248203 | A1 * | 9/2013 | Scott | E21B 34/066 166/373 |
| 2014/0034303 | A1 | 2/2014 | Joseph et al. | |
| 2014/0345404 | A1 * | 11/2014 | Wu | F16D 11/10 74/405 |
| 2014/0366283 | A1 * | 12/2014 | Jun | D06F 37/304 8/137 |
| 2015/0020555 | A1 * | 1/2015 | Jun | D06F 37/304 68/140 |
| 2015/0263575 | A1 * | 9/2015 | Pace | B66D 1/12 166/355 |
| 2018/0026489 | A1 * | 1/2018 | Hill | D06F 37/30 68/140 |

OTHER PUBLICATIONS

Search Report dated Jan. 7, 2019 for EP Application No. 16812393.3, 14 pages.

Application and File history for U.S. Appl. No. 14/874,687, filed Oct. 5, 2015. Inventors: Glikin et al.

Office Action dated Sep. 12, 2019 for Chinese Application No. 201680041921.X, 18 pages.

* cited by examiner

ACTUATOR FOR CHOKE VALVE

RELATED APPLICATION INFORMATION

This application claims the benefit of U.S. Provisional Application 62/180,411, filed Jun. 16, 2015, which is hereby incorporated by reference.

TECHNICAL FIELD

The present disclosure relates generally to subterranean boreholes. More particularly, the present disclosure relates to systems for controlling the operating pressures of fluid within subterranean boreholes.

BACKGROUND

Well drilling is the process of drilling a borehole in the ground for extraction of natural resources, such as natural gas or petroleum. During the well drilling process, fluid from the surface, commonly referred to as "drilling mud," is pumped into the well to maintain a desired pressure within the borehole. The desired pressure should be sufficiently high to inhibit the intrusion of unwanted materials into the borehole, but not so high as to cause the walls of the borehole to fracture.

One method for maintaining the desired pressure is through a drilling process referred to as Managed Pressure Drilling (MPD). The objectives of MPD are to ascertain the downhole pressure environment limits and to manage the annual hydraulic pressure profile accordingly. Choke valves are utilized during MPD to control the pressure.

In particular, when an underground void or fracture is encountered, the drilling mud will naturally drain from the borehole to fill the fracture. In some cases, the drilling mud draining into the fracture will cause gas originally trapped within the fracture to be forced up through the borehole, thereby causing a pressure spike or kick in the borehole. Failure to adequately control these kicks can lead to a blowout of the well.

Choke valves have been traditionally operated by pneumatic actuated systems, hydraulic actuated systems and electric valve systems driven by conventional brush motors. However, each of these systems has drawbacks, particularly in the harsh environment of well drilling.

Pneumatic actuated systems are generally easy to maintain, however, they have some limitations. In particular, pneumatic actuated valves require more shift force when in a static state than when the valve is in motion. This trait is commonly referred to as "stick slip." To overcome stick slip, pneumatic actuated systems build up excess pressure, which can create a rapid movement once the valve is in motion. The resulting overshoot can delay or inhibit achieving a desired valve set point.

The air quality and temperature can also adversely affect the performance of pneumatic actuated systems. Poor air quality can cause the pneumatic actuated valves to operate below their peak performance and efficiency, which can lead to premature component failure. Moreover, in freezing temperatures the control valves, actuators, air lines, and controllers can seize, which can incapacitate the entire system.

Hydraulic actuated systems may be less likely to be affected by poor air quality, but can still be negatively affected by temperature. For example, temperatures below freezing can increase the viscosity, making the hydraulic fluid difficult to push through the system. At high temperatures the viscosity of the hydraulic fluid can decrease, thereby causing the hydraulic fluid to flow through smaller openings, requiring more flow and thus more power. Hydraulic actuated systems are also known to require a high degree of maintenance to ensure proper performance.

Electrical valve systems with brush motors offer some improvements over traditional fluid driven systems; however, these systems also have their limitations. In particular, the frequent cycling of power on and off to stop and start motion can cause the brushes to wear out, which can ultimately result in a system failure.

Additionally, a drawback common to pneumatic, hydraulic and conventional brush motor driven actuators is that they generally all are comprised of several components. Accordingly, these traditional systems add bulk and complexity to the well drilling system. Moreover, when the actuator fails to operate properly, a user must identify which of the components has failed, thereby increasing the amount of time that the well drilling system is down during maintenance.

Accordingly, what is needed in the industry is an improved actuator for a choke valve that overcomes the drawbacks presented by traditional pneumatic, hydraulic and conventional brush motor driven actuators. Moreover, what is needed in the industry is an actuator for a choke valve with no peripheral components, and that can be easily replaced, thereby reducing the amount of time that a given well drilling system is down for maintenance.

SUMMARY OF THE DISCLOSURE

Embodiments of the present disclosure meet the need of the industry for an improved actuator for a well system choke valve that is cost effective, easy to maintain, is not significantly affected by poor air quality or extreme temperatures, and is not subject to rapid wear by the cycling of power on and off. In part, this is accomplished through the employment of a brushless servo motor.

Unlike brush motors that pass current through an armature, brushless servo motors use a permanent magnet rotor and a wound stator. Since no brushes come into contact with the motor, mechanical or electrical breakdowns are rare. Moreover, operation of a brushless servo motor is not significantly affected by poor air quality or the extreme temperatures that are common to the well drilling environment.

Brushless servo motor actuation systems also have the benefit of enabling more precise control than traditional actuator systems, particularly that of traditional pneumatic and hydraulic systems. Embodiments of the present disclosure generally include some form of continuous position feedback from the rotor to maintain proper phasing and function, which in turn enables high resolution, accuracy and repeatability of choke valve actuation. Moreover, solid-state electronics and system tuning enable embodiments of the present disclosure to respond in milliseconds to execute motion commands.

To prevent loss of control or freewheeling in the event of an electrical power loss, embodiments of the present disclosure can include a brake, mechanically biased to an engaged, breaking position that can be selectively shifted to a disengaged, non-breaking position when power is applied. During electrical power loss, actuation of the choke valve can be accomplished by an override mechanism, which can enable an operator to manually open, close or otherwise adjust the position of the choke valve.

Embodiments of the present disclosure further meet the need of the industry for an improved actuator for a well system choke valve that includes no peripheral components, such that the actuator can be installed and/or removed with relative ease, thereby reducing the amount of time that the well drilling system is down for maintenance of the actuator. In part, this is accomplished through a compact design in which many of the components are hollow and/or tubular, so that the components can be aligned along a common longitudinal axis. For example, in one embodiment, certain components of the actuation system can define a hollow core sized to permit a portion of other components to pass therethrough, so that the two components can at times be nested together for the purpose of reducing the overall length of the actuation unit along the longitudinal axis.

Unlike traditional pneumatic and hydraulic systems, embodiments of the present disclosure do not require a pressurized fluid supply. Accordingly, the peripheral components common to these systems, such as fluid pressurization power units, flow control valves, filters, accumulators, hydraulic cylinders, and pressure gauges can be eliminated, thereby reducing the overall size and complexity of the actuation system. Moreover, axially aligning a brushless servo motor with a gear reducer and planetary roller actuator, enables embodiments of the present disclosure to fit within a single compact housing, thereby simplifying installation and removal of the actuator assembly to reduce maintenance downtime of the well system.

One embodiment of the present disclosure provides a compact, axially aligned brushless servo motor actuation unit configured to manipulate a choke valve to control the pressure within a borehole during managed pressure drilling. The actuation unit can include a tubular housing, a brushless servo motor, a gear reduction assembly, and a planetary roller actuator. The tubular housing can have a longitudinal axis. The brushless servo motor can include a rotor shaft, and can be positioned within the tubular housing such that an axis of the rotor shaft is substantially aligned with the longitudinal axis of the tubular housing. The gear reduction assembly can be positioned within the tubular housing and operably coupled to the rotor shaft of the brushless servo motor. The gear reduction assembly can be configured to reduce the revolutionary output of the brushless servo motor rotor shaft. The planetary roller actuator can have a roller nut and a roller screw. The roller nut can be operably coupled to the gear reduction assembly, such that rotation of the roller nut affects actuation of the roller screw relative to the roller nut. The planetary roller actuator can be positioned within the tubular housing such that an axis of the roller screw is substantially aligned with the longitudinal axis of the tubular housing. The gear reduction assembly can define a hollow core sized to permit a portion of the roller screw to pass therethrough for the purpose of reducing the overall length of the actuation unit along the longitudinal axis.

In one embodiment, the actuation unit further includes a brake assembly operably coupled to the brushless servo motor rotor shaft and mechanically biased to an engaged, breaking position when no electrical power is supplied to the actuation unit. In one embodiment, the actuation unit further includes a manual override operably coupled to the rotor shaft and configured to enable manipulation of the roller screw when no electrical power is supplied to the actuation unit.

In one embodiment, the actuation unit further includes a continuous feedback control system operably coupled to the rotor shaft and configured to maintain proper rotational control of the rotor shaft. In one embodiment, the continuous feedback control system can be coupled to the rotor shaft via a spider coupling for the purpose of relaxing manufacturing tolerances and easing assembly. In one embodiment, the planetary roller actuator can be coupled to the gear reduction assembly via a plurality of drive pins for the purpose of relaxing manufacturing tolerances and easing assembly.

In one embodiment, the tubular housing can include a hook configured to aid in the positioning of the actuation unit. In one embodiment, the tubular housing can include a flanged portion configured to be operably coupled to the choke valve. In one embodiment, the tubular housing can include a nose sized and shaped to fit within a portion of the choke valve. In one embodiment, the roller screw can include an anti-rotate track roller configured to slide along a groove defined within the nose of the tubular housing for the purpose of inhibiting rotation of the roller screw.

Another embodiment of the present disclosure provides a self-contained brushless servo motor actuation system having a compact design configured to be readily transported and positioned for ease in coupling to a choke valve of a managed pressure drilling system for the purpose of reducing the maintenance downtime of the drilling system during coupling. The actuation system can include a brushless servo motor, a gear reduction assembly and a planetary roller actuator. The brushless servo motor can have a continuous feedback control system configured to maintain proper rotational control of an output rotor shaft. The gear reduction assembly can be operably coupled to the brushless servo motor and can be configured to reduce the rotational output of the output rotor shaft. The planetary roller actuator can be operably coupled to the gear reduction assembly and can be configured to translate a rotational output of the gear reduction assembly to a linear actuation of a roller screw by the rotation of a roller nut. The brushless servo motor, gear reduction assembly and planetary roller actuator can be substantially aligned along a longitudinal axis and can be housed within a tubular housing unit. The gear reduction assembly can define a hollow core sized to permit a portion of the roller screw to pass therethrough for the purpose of reducing the overall length of the actuation unit along the longitudinal axis.

In one embodiment, the actuation system includes a brake assembly operably coupled to the output rotor shaft and mechanically biased to an engaged, breaking position when no electrical power is supplied to the actuation system. In one embodiment, the actuation system includes a manual override operably coupled to the output rotor shaft and configured to enable manipulation of the roller screw when no electrical power is supplied to the actuation system.

In one embodiment, the continuous feedback control system can be coupled to the output rotor shaft via a spider coupling for the purpose of relaxing manufacturing tolerances and easing assembly. In one embodiment, the planetary roller actuator can be coupled to the gear reduction assembly via a plurality of drive pins for the purpose of relaxing manufacturing tolerances and easing assembly.

In one embodiment, the tubular housing unit can include a hook configured to aid in the positioning of the actuation system. In one embodiment, the tubular housing unit can include a flanged portion configured to be operably coupled to the choke valve. In one embodiment, the tubular housing unit can include a nose sized and shaped to fit within a portion of the choke valve. In one embodiment, the actuation thrust rod can be operably coupled to the roller screw and configured to engage with the choke valve. In one embodiment, the actuation thrust rod can include an anti-rotate track roller configured to slide along a groove defined within the tubular housing unit for the purpose of inhibiting rotation of the actuation thrust rod.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1A:
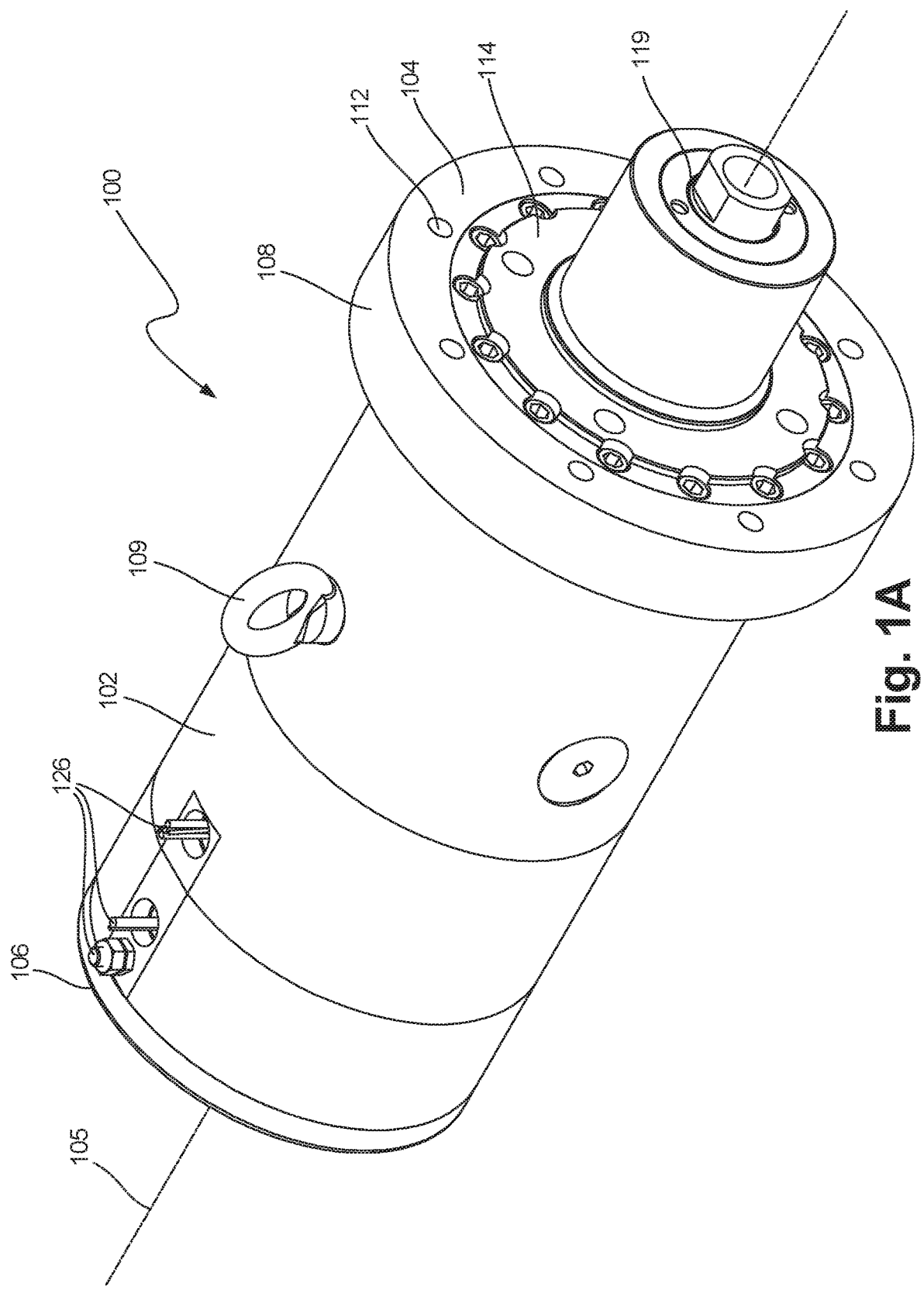
FIG. 1A is a perspective view depicting a brushless servo motor actuation unit in accordance with an embodiment of the disclosure.
Figure 1B:
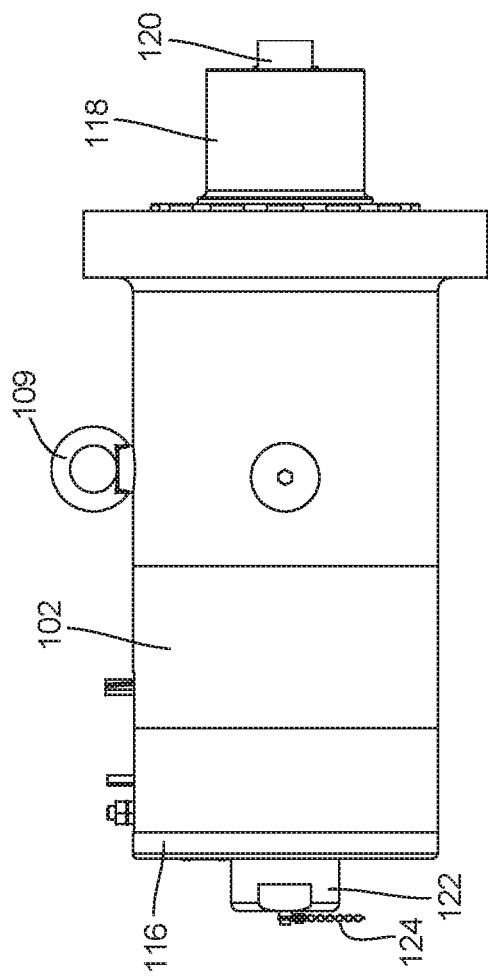
FIG. 1B is a plan view depicting the brushless servo motor actuation unit of FIG. 1A.
Figure 1C:
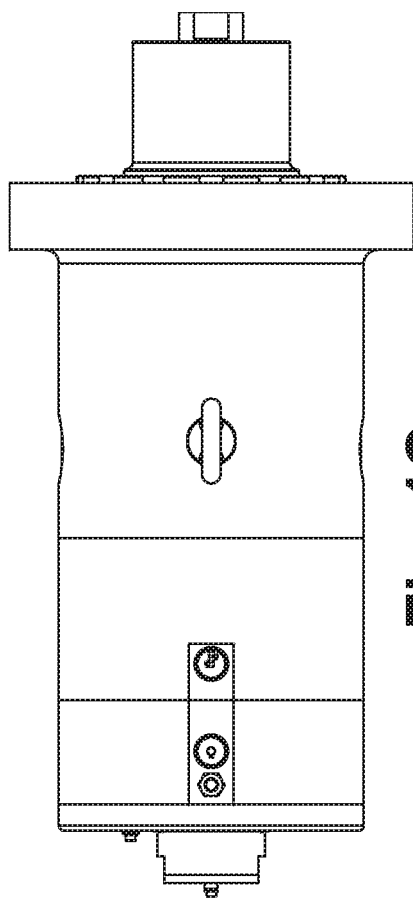
FIG. 1C is a top view depicting the brushless servo motor actuation unit of FIG. 1A.
Figure 1D:
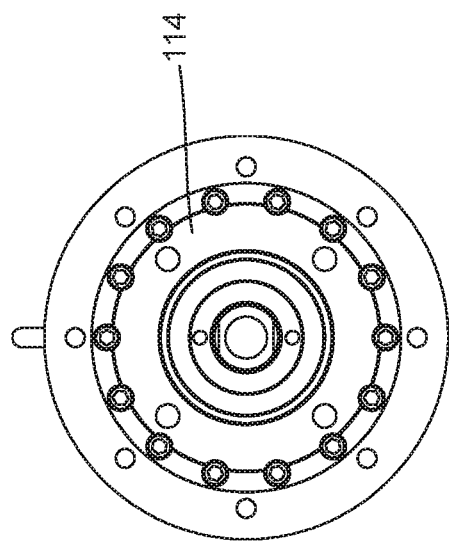
FIG. 1D is a distal end view depicting the brushless servo motor actuation unit of FIG. 1A.
Figure 1E:
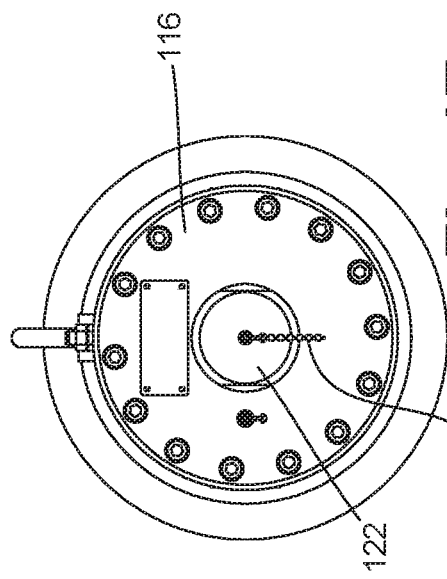
FIG. 1E is a proximal end view depicting the brushless servo motor actuation unit of FIG. 1A.

While embodiments of the disclosure are amenable to various modifications and alternative forms, specifics thereof are shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

Referring to FIGS. 1A-E, various views of a brushless servo motor actuation system or unit 100 are depicted in accordance with an embodiment of the disclosure. In one embodiment, the actuation unit 100 includes a housing 102. Housing 102 can be substantially tubular in shape with a distal end 104 and a proximal end 106 positioned along a longitudinal axis 105. In one embodiment, housing 102 can be comprised of a plurality of components. For example, in one embodiment, housing 102 can include back cover 116, housing 147, housing 139, housing 168, and front cover 114. In one embodiment, housing 102 can include a hook 109 configured to aid in the transport and positioning of the actuation unit 100.

Figure 2A:
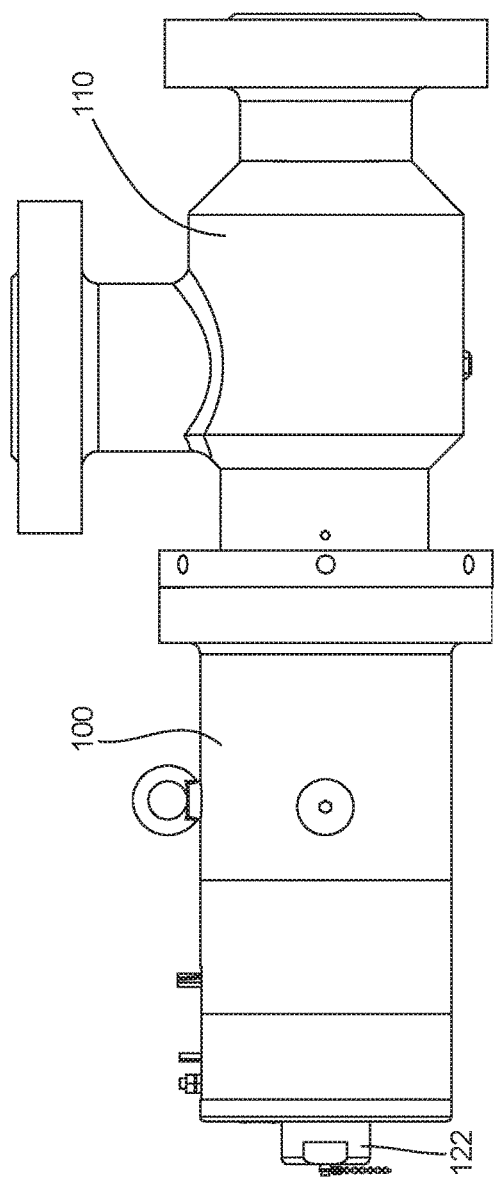
FIG. 2A is a plan view depicting a brushless motor actuation unit operably coupled to a choke valve in accordance with an embodiment of the disclosure.
Figure 2B:
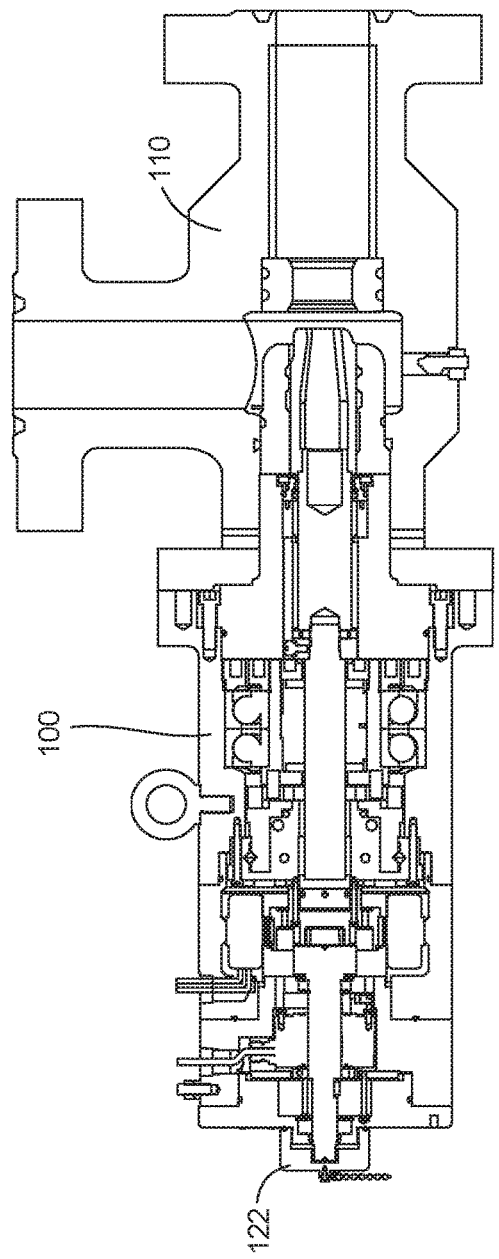
FIG. 2B is a cross-sectional view depicting the brushless motor activation unit and choke valve of FIG. 2A.
Figure 3:
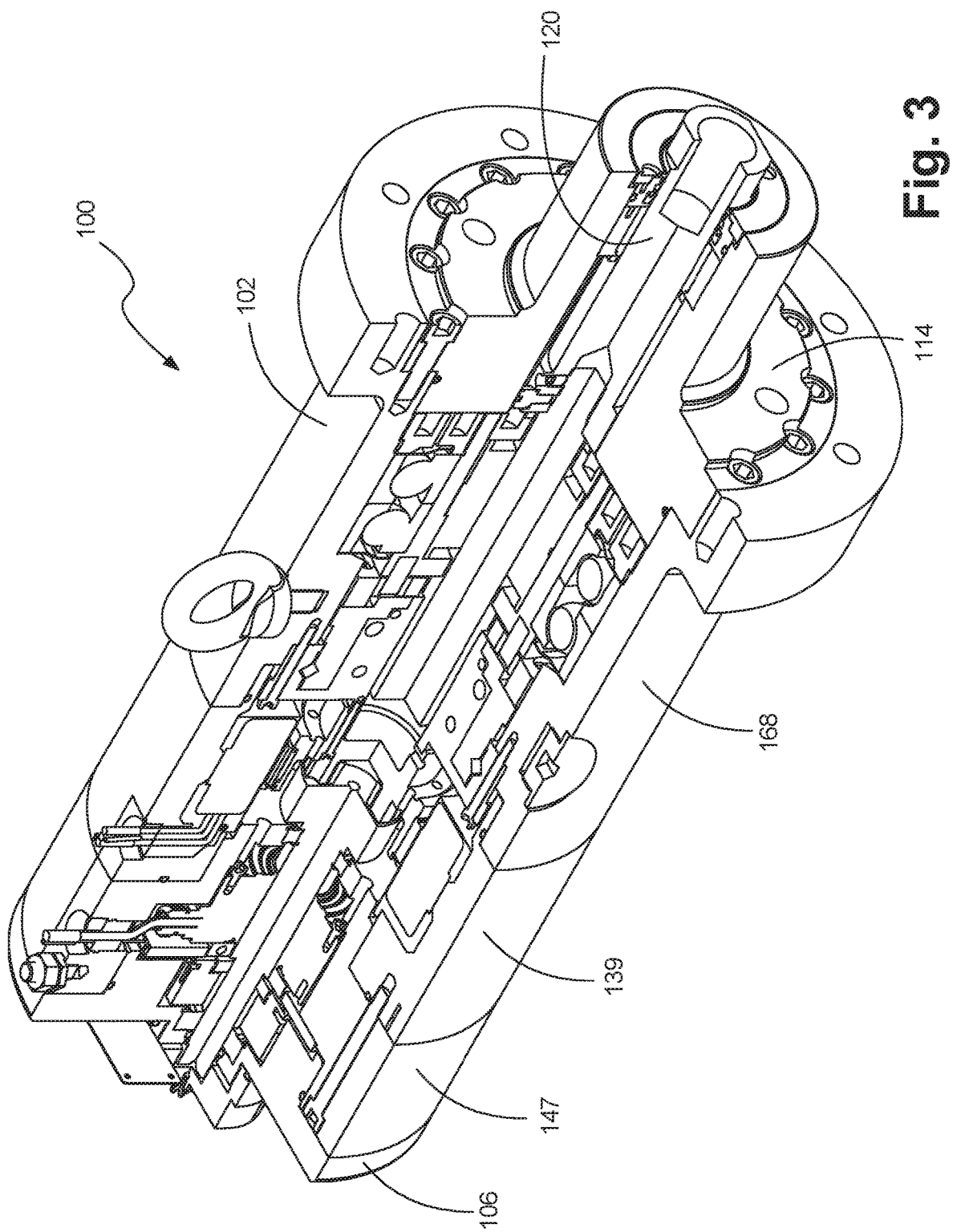
FIG. 3 is a perspective, partial cross sectional view depicting a brushless servo motor actuation unit in accordance with an embodiment of the disclosure.
Figure 4:
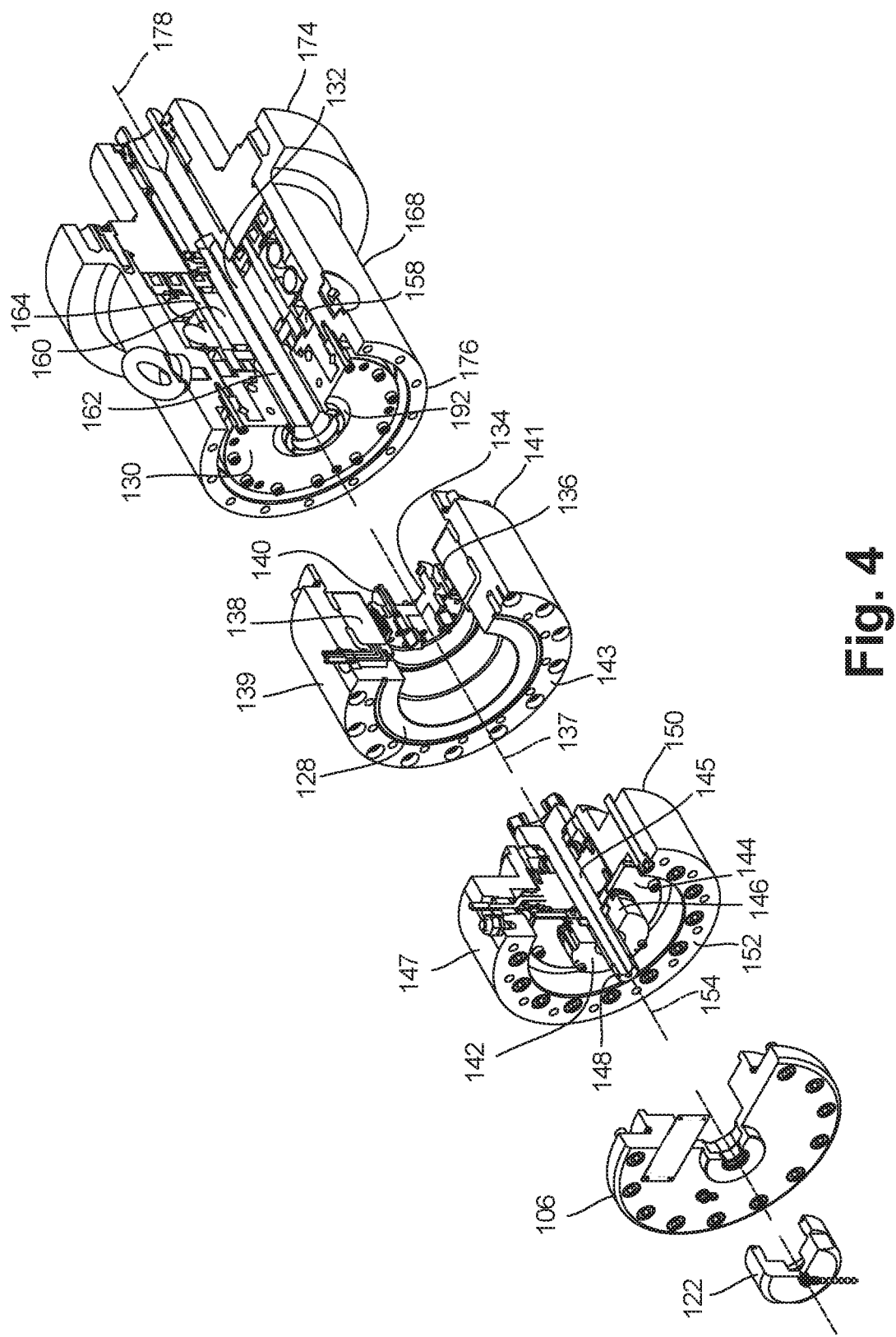
FIG. 4 is an exploded, perspective, partial cross sectional view depicting a brushless servo motor actuation unit in accordance with an embodiment of the disclosure, wherein the longitudinal axes of a motor housing, continuous feedback control system and brake assembly housing, and gear reduction assembly and planetary roller actuator housing are substantially aligned.
Figure 5:
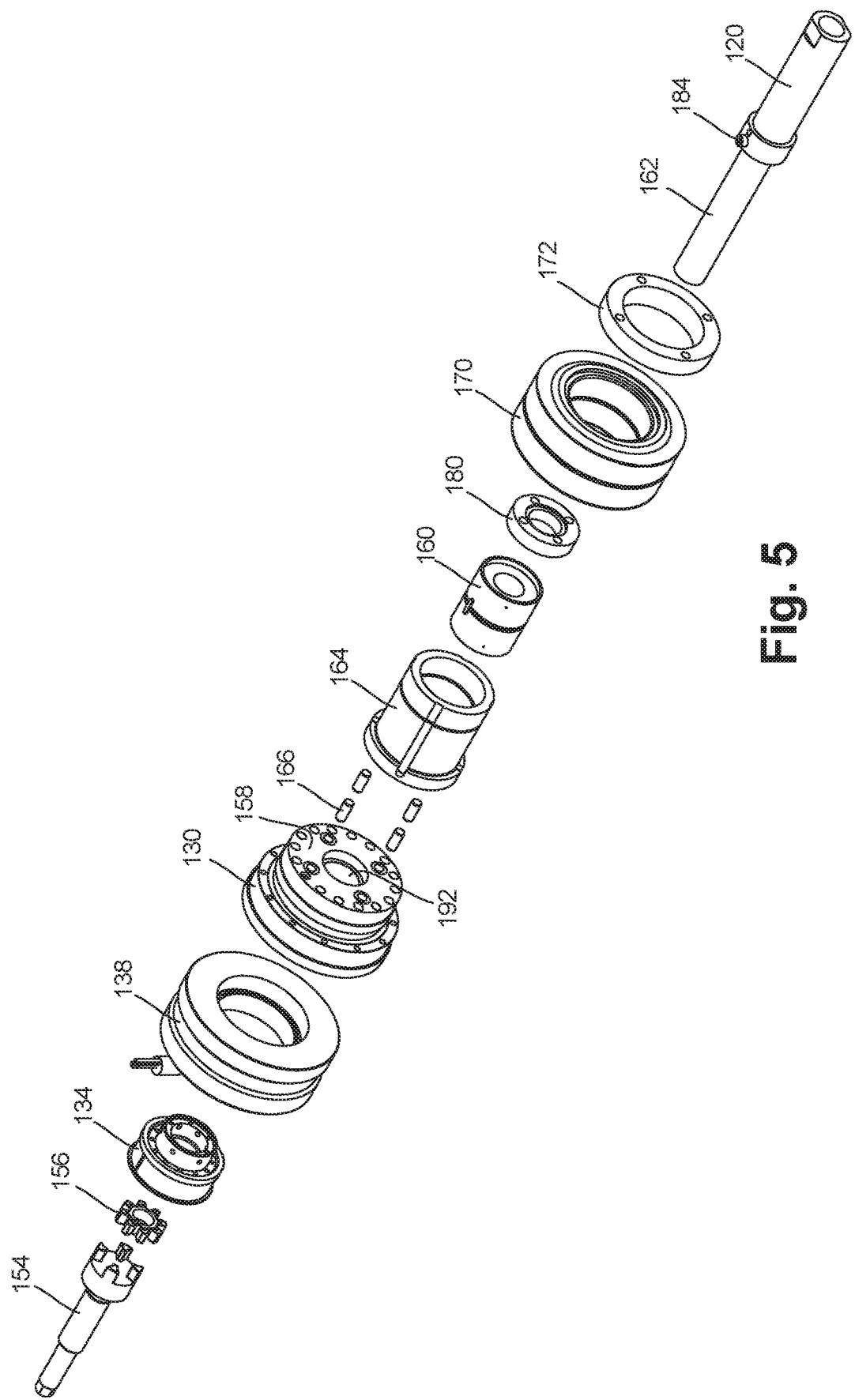
FIG. 5 is an exploded, perspective view depicting the interconnection of various components of a brushless server motor actuation unit in accordance with an embodiment of the disclosure.

As depicted in FIGS. 2A-B, in one embodiment, the distal end 104 can include a flanged portion 108 configured to be operably coupled to a choke valve 110 of a managed pressure drilling system. For example, flanged portion 108 can be coupled to choke valve 110 by a plurality of fasteners, such as bolts, at least partially secured in position by a plurality of apertures 112 defined in flanged portion 108.

A front cover 114 and a back cover 116 can be operably coupled to, or included as part of, housing 102, thereby capping the ends of the housing 102 to protect and contain the components contained therein. In one embodiment, the front cover 114 in the back cover 116 can be coupled to the housing 102 by a plurality of fasteners, such as bolts.

In one embodiment, the front cover 114 can include a nose portion 118 defining an aperture 119 configured to support and permit actuation of an actuation thrust rod 120. In some embodiments, nose portion 118 can be sized and shaped to fit or mate with a portion of choke valve 110.

In one embodiment, a manual override access cap 122 can selectively couple to back cover 116. For example, in one embodiment, manual override access cap 122 can threadably couple to back cover 116, thereby securing manual override access cap 122 to back cover 116. A tether 124 can operably couple manual override access cap 122 to back cover 116 when manual override access cap 122 is unsecured from cover 116.

In one embodiment, electrical couplings 126 operably coupled to electrical components contained within housing 102 can extend from housing 102.

As depicted in FIG. 2A-7, various cross-sectional and/or exploded views of the brushless server motor actuator unit 100 are depicted in accordance with an embodiment of the disclosure. In one embodiment, the actuator unit includes a brushless server motor 128, a gear reduction assembly 130 and a planetary roller actuator 132.

Brushless server motor 128 can include a rotor 134 at least partially surrounded by a plurality of permanent magnets 136. Rotor 134 can be configured to rotate about an axis of rotation within and relative to a stator 138. Stator 138 can include a plurality of electrical windings, which can be configured to produce a magnetic field when electrical power (e.g. current) passes through the electrical windings. In one embodiment, lead wires 141 can be in electrical communication with the electrical windings and can extend to the exterior of housing 102. The interaction of the magnetic forces between the permanent magnets 136 and the magnetic field of the stator 138 can cause rotation of the rotor 134 relative to the stator 138. A shaft 140 can be operably coupled to the rotor 134, and can be configured to couple to other components as a mechanical output of the brushless server motor 128.

In one embodiment, motor 128 can be contained within a housing 139, such that stator 138 is fixed in position relative to housing 139. Housing 139 can be substantially cylindrical in shape with a distal end 141 and a proximal end 143 positioned along a longitudinal axis 137.

Motor 128 can further include a continuous feedback control system 142, configured to maintain proper phasing and function of motor 128, thereby enabling the position, speed and torque of motor 128 to be precisely controlled and continuously monitored. In one embodiment, the continuous feedback control system 142 includes an encoder 144 configured to provide positional feedback of rotor 134 relative to stator 138. In one embodiment, encoder 144 can at least partially surround an encoder shaft 145, which can be operably coupled to rotor 134 and supported by one or more ball bearing supports. One or more electrical connections 126 originating from the continuous feedback control system 142 and/or encoder 144 can extend to the exterior of housing 102.

In one embodiment, the continuous feedback control system 142 enables motor 128 to automatically compensate for varying conditions exerted upon rotor 134. For example, the continuous feedback control system 142 can enable the monitoring of speed and torque via positional feedback provided by the encoder 144, which can in turn be used to adjust the power input to motor 128 to compensate for increased force requirements that may be experienced during a pressure surge, blockage or contamination in the choke valve.

In one embodiment, motor 128 can operate with a rotational speed of between 2,000 and 6,000 RPM. In one embodiment, motor 128 operates with a rotational speed of approximately 4,000 RPM.

In one embodiment, a brake assembly 146 can be operably coupled to rotor 134 or encoder shaft 145. Brake assembly 146 can be mechanically biased to an engaged, breaking position, thereby inhibiting rotation of rotor 134 or encoder shaft 145 when electrical power to actuation unit 100 is disconnected or interrupted. For example, in one embodiment brake assembly 146 is biased to the engaged, breaking position by a spring. The mechanical bias of brake assembly 146 can be overcome when electrical power is provided to the brake assembly 146, thereby shifting the brake assembly 146 to a disengaged, nonbreaking position, whereby the brake assembly 146 provides minimal resistance to rotation of rotor 134 and encoder shaft 145. Accordingly, brake assembly 146 is an added safety precaution to inhibit inadvertent or unwanted movement of the actuation unit 100 and attached choke valve 110 in the event of an electrical power loss or malfunction.

In one embodiment, the feedback control system 142 and the brake assembly 146 can be contained in a housing 147. Housing 147 can be substantially cylindrical in shape with a distal end 150 and a proximal end 152 positioned along a longitudinal axis 154. In one embodiment, the distal end 150 of housing 147 can be operably coupled to the proximal end 143 of the housing 139 for motor 128, such that the two longitudinal axes 154, 137 are substantially aligned.

Figure 7:
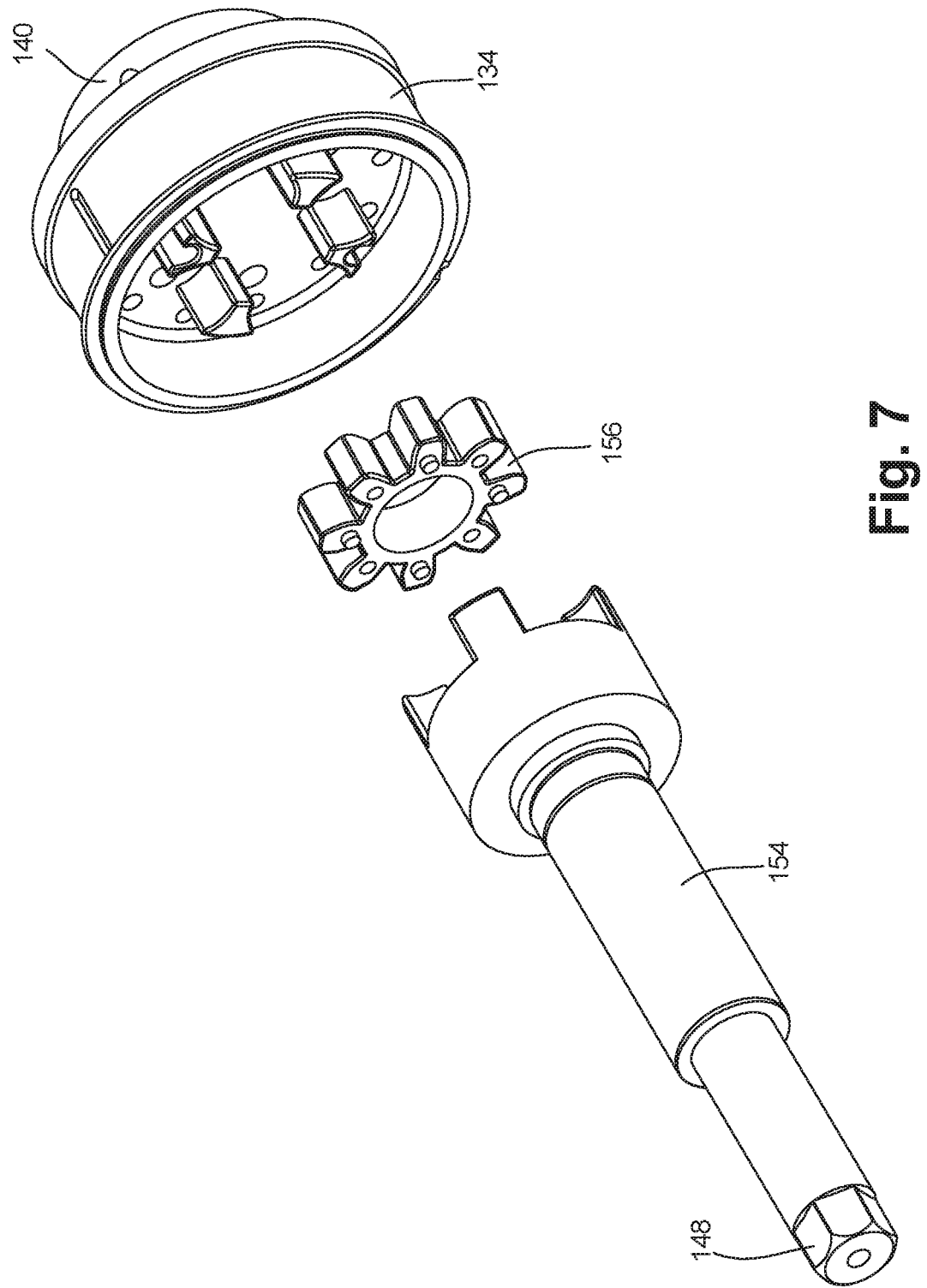
FIG. 7 is an exploded, perspective view depicting a rotor, encoder shaft and spider coupling of a brushless server motor actuation unit in accordance with an embodiment of the disclosure.

As depicted in FIG. 7, in one embodiment, the encoder shaft 145 can be coupled to the rotor 134 via a compliant spider coupling 156. Compliant spider coupling 156 can be configured to compensate for misalignment of coaxial components due to manufacturing tolerances, as well as to streamline assembly of the actuation unit 100.

In one embodiment, a portion of encoder shaft 145 or rotor 134 can extend out of the proximal end 106 of housing 102, thereby enabling a user to manually override operation of the actuation unit 100 in the event of a malfunction or interruption in electrical power. The portion of the encoder shaft 145 or rotor 134 extending from the housing 102 can be referred to as the manual override 148. The manual override 148 can be selectively covered by a manual override access cap 122.

Such a malfunction or interruption in electrical power may occur during a drilling operation, and the ability to control the actuation unit 100 may be necessary to prevent damage to the well, drilling equipment and/or injury to workers. Accordingly, a user can uncouple the manual override access cap 122 from the back cover 116 to expose the manual override 148. A tool, such as a wrench, can be coupled to the manual override 148, such that rotation of the manual override 148 can cause manipulation of the actuation unit 100.

Gear reduction assembly 130 generally comprises a plurality of gears coupled between motor 128 and planetary roller actuator 132. In one embodiment, gear reduction assembly 130 is configured as a planetary gear assembly. The gears can be sized and selected to provide a desired reduction in rotational speed of the output of motor 128. A large gear reduction between motor 128 and planetary roller actuator 132 inhibits back driving of motor 128 due to high pressures experienced by a choke valve 110 during drilling operations. For example, suitable gear ratios for embodiments of the present disclosure can range between 30:1 and 60:1. In one embodiment, the gear ratio is approximately 50:1. In one embodiment, the output of the gear reduction assembly 130 is a drive ring 158 configured to drive the planetary roller actuator 132.

Planetary roller actuator 132 generally includes a roller nut 160 and a roller screw 162. Roller nut 160 can be fixedly coupled to a roller nut housing 164, which in turn can be operably coupled to the output of gear reduction assembly 130. For example, in one embodiment, roller nut housing 164 can be coupled to the output of gear reduction assembly 130 by a plurality of drive pins 166. In this embodiment, the drive pins 166 enable axial compliance between the roller nut housing 164 and the gear reduction assembly 130 while enabling the transmission of torque.

In one embodiment, the gear reduction assembly 130 and the roller nut housing 164 (as well as other portions of the planetary roller actuator 132) can be contained in a housing 168. Housing 168 can be substantially cylindrical in shape with a distal end 174 and a proximal end 176 positioned along a longitudinal axis 178. In one embodiment, the proximal end 176 of housing 168 can be operably coupled to the distal end 143 of housing 139 for motor 128, such that the two longitudinal axes 137, 178 are substantially aligned.

Roller nut housing 164 can be rotatable relative to housing 168, to enable actuation of planetary roller actuator 132. In one embodiment, a ball bearing support 170 is positioned between housing 168 and the roller nut housing 164, to ease in the rotation of roller nut housing 164 relative to housing 168. A roller nut housing retainer nut 172 can be positioned to inhibit axial movement of the roller nut housing 164 relative to housing 168.

Rotation of roller nut 160 can cause roller screw 162 to shift axially relative to roller nut 160 between a fully extended position, a fully retracted position in all positions therebetween. Additional support for roller screw 162 can be provided by bearing support 180.

Figure 6:
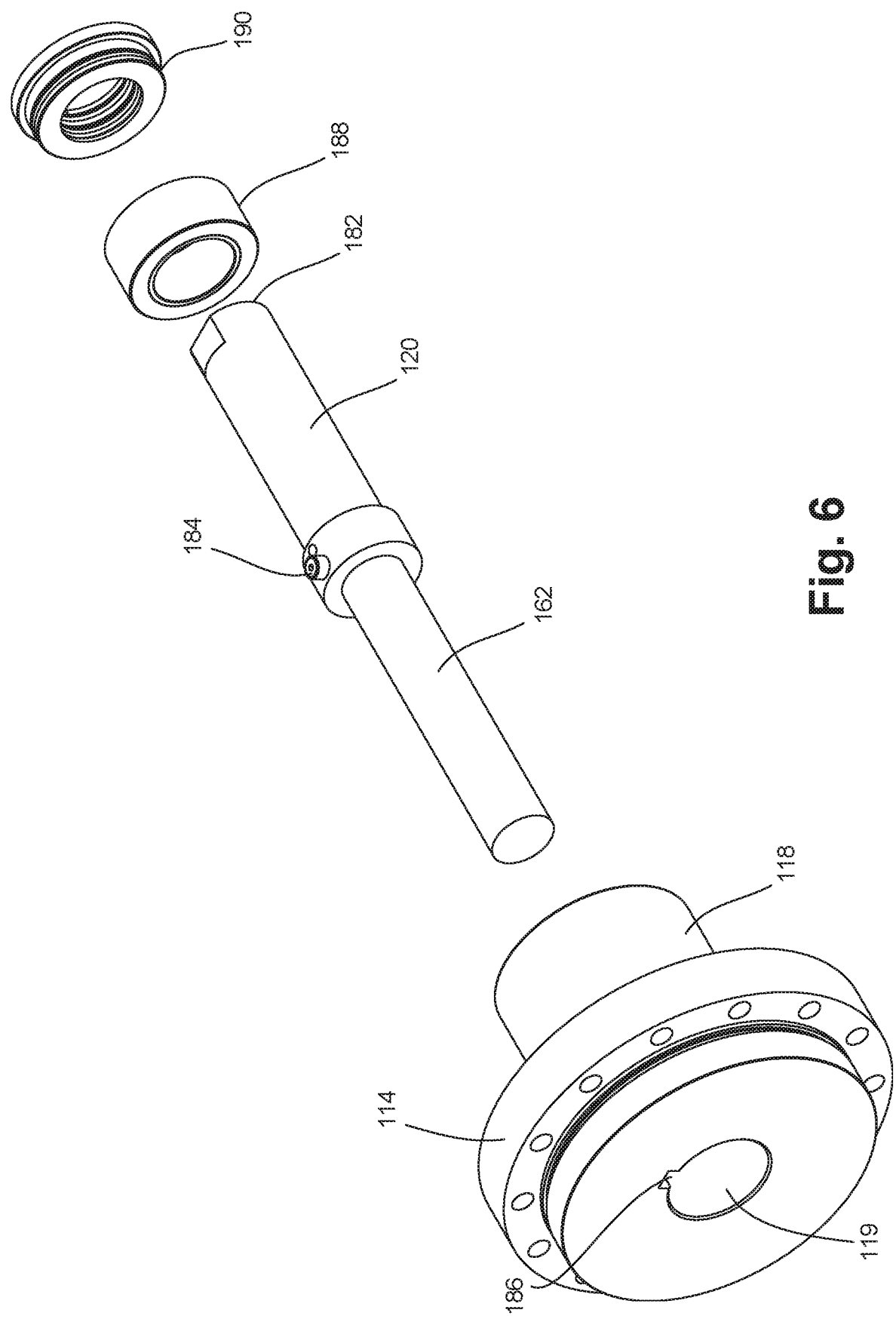
FIG. 6 is an exploded, perspective view depicting a roller screw, actuation thrust rod, nose, support bearing, and wiper of a brushless server motor actuation unit in accordance with an embodiment of the disclosure.

In one embodiment, an actuation thrust rod 120 is operably coupled to roller screw 162. In other embodiments, the roller screw 162 comprises actuation thrust rod 120. Actuation thrust rod 120 can include a distal end 182 configured for attachment to the choke valve 110. As depicted in FIG. 6, and one embodiment, actuation thrust rod 120 can include an anti-rotate track roller 184. Anti-rotate track roller 184 can be configured to slide along a groove 186 defined within aperture 119, thereby inhibiting actuation thrust rod 120 from rotating relative to front cover 114 and housing 102. Support for actuation thrust rod 120 can be provided in part by bearing support 180. Additionally, a wiper 190 configured to inhibit lubricant from leaking out of housing 102 can be positioned adjacent to bearing support 188, and the distal end of hose 118.

To facilitate a more compact design in which the components are aligned along a common longitudinal axis, the gear reduction assembly 130 can define a hollow core 192 sized to permit a portion of roller screw 162 to pass therethrough. Accordingly, hollow core 192 enables the overall length of the actuation unit 100 to be reduced in size by several inches along the longitudinal axis, thereby providing a more compact actuation unit 100 that can be handled with greater ease.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A compact, axially aligned brushless servo motor actuation unit configured to be received within a portion of a choke valve, the choke valve portion presenting a longitudinal axis, the actuation unit configured to manipulate the choke valve to control the pressure within a borehole during managed pressure drilling, the actuation unit comprising:
a tubular housing having a longitudinal axis the tubular housing adapted to be received by the choke valve portion with the tubular housing longitudinal axis aligned with the choke valve portion longitudinal axis;
a brushless servo motor having a rotor shaft, wherein the brushless servo motor is positioned within the tubular housing such that an axis of the rotor shaft is substantially aligned with the longitudinal axis of the tubular housing;
an annular gear reduction assembly positioned within the tubular housing and operably coupled to the rotor shaft of the brushless servo motor, the annular gear reduction assembly presenting a longitudinal axis substantially aligned with the longitudinal axis of the tubular housing configured to reduce the output of the brushless servo motor rotor shaft; and
a planetary roller actuator having a roller nut and a roller screw, the roller nut operably coupled to the gear reduction assembly, such that rotation of the roller nut affects actuation of the roller screw relative to the roller nut, wherein the planetary roller actuator is positioned within the tubular housing such that an axis of the roller screw is substantially aligned with the longitudinal axis of the tubular housing, and wherein the annular gear reduction assembly defines a hollow core aligned with the longitudinal axis of the tubular housing, the hollow core sized to enable a portion of the roller screw to longitudinally shift therethrough upon rotation of the roller nut for the purpose of reducing the overall length of the actuation unit along the longitudinal axis.

2. The actuation unit of claim 1, further comprising a brake assembly operably coupled to the brushless servo motor rotor shaft and mechanically biased to an engaged, breaking position when no electrical power is supplied to the actuation unit.

3. The actuation unit of claim 1, further comprising a manual override operably coupled to the rotor shaft and configured to enable manipulation of the roller screw when no electrical power is supplied to the actuation unit.

4. The actuation unit of claim 1, further comprising a continuous feedback control system operably coupled to the rotor shaft and configured to maintain proper rotational control of the rotor shaft.

5. The actuation unit of claim 4, wherein the continuous feedback control system is coupled to the rotor shaft via a spider coupling.

6. The actuation unit of claim 1, wherein the planetary roller actuator is coupled to the gear reduction assembly via a plurality of drive pins.

7. The actuation unit of claim 1, wherein the tubular housing includes a hook configured to aid in the positioning of the actuation unit.

8. The actuation unit of claim 1, wherein the tubular housing includes a flanged portion configured to be operably coupled to the choke valve.

9. The actuation unit of claim 1, wherein the tubular housing includes a nose sized and shaped to fit within a portion of the choke valve.

10. The actuation unit of claim 9, wherein the roller screw includes an anti-rotate track roller configured to slide along a groove defined within the nose of the tubular housing for the purpose of inhibiting rotation of the roller screw.

11. A self-contained brushless servo motor actuation system having a compact design configured to be readily transported and positioned for ease in coupling to a choke valve of a managed pressure drilling system for the purpose of reducing the maintenance downtime of the drilling system during coupling, the choke valve presenting a choke valve portion adapted for coupling to the servo motor actuation system, the choke valve portion presenting a choke valve portion longitudinal axis, the actuation system comprising:
- a brushless servo motor having a continuous feedback control system configured to maintain proper rotational control of an output rotor shaft;
- an annular gear reduction assembly operably coupled to the brushless servo motor, and configured to reduce the rotational output of the output rotor shaft; and
- a planetary roller actuator operably coupled to the gear reduction assembly and configured to translate a rotational output of the gear reduction assembly to a linear actuation of a roller screw by the rotation of a roller nut,
- wherein the brushless servo motor, gear reduction assembly and planetary roller actuator are substantially aligned along a common longitudinal axis and housed within a tubular housing unit, and wherein the gear reduction assembly defines a hollow core aligned with the common longitudinal axis and sized to enable a portion of the roller screw to longitudinally shift therethrough upon rotation of the roller nut for the purpose of reducing the overall length of the actuation unit along the longitudinal axis, and the tubular housing unit adapted to be received by the choke valve portion with the common longitudinal axis aligned with the choke valve portion axis.

12. The actuation system of claim 11, further comprising a brake assembly operably coupled to the output rotor shaft and mechanically biased to an engaged, breaking position when no electrical power is supplied to the actuation system.

13. The actuation system of claim 11, further comprising a manual override operably coupled to the output rotor shaft and configured to enable manipulation of the roller screw when no electrical power is supplied to the actuation system.

14. The actuation system of claim 11, wherein the continuous feedback control system is coupled to the output rotor shaft via a spider coupling.

15. The actuation system of claim 11, wherein the planetary roller actuator is coupled to the gear reduction assembly via a plurality of drive pins.

16. The actuation system of claim 11, wherein the tubular housing unit includes a hook configured to aid in the positioning of the actuation system.

17. The actuation system of claim 11, wherein the tubular housing unit includes a flanged portion configured to be operably coupled to the choke valve.

18. The actuation system of claim 11, wherein the tubular housing unit includes a nose sized and shaped to fit within a portion of the choke valve.

19. The actuation system of claim 11, further comprising an actuation thrust rod operably coupled to the roller screw and configured to engage with the choke valve.

20. The actuation system of claim 19, wherein the actuation thrust rod includes an anti-rotate track roller configured to slide along a groove defined within the tubular housing unit for the purpose of inhibiting rotation of the actuation thrust rod.

* * * * *

UNITED STATES PATENT AND TRADEMARK OFFICE
CERTIFICATE OF CORRECTION

| | | |
|---|---|---|
| PATENT NO. | : 10,536,052 B2 | Page 1 of 1 |
| APPLICATION NO. | : 15/183430 | |
| DATED | : January 14, 2020 | |
| INVENTOR(S) | : Ryan Bourgoine et al. | |

It is certified that error appears in the above-identified patent and that said Letters Patent is hereby corrected as shown below:

On the Title Page

In item (71), in Column 1, under "Applicant", Line 1, delete "Tol-O-Matic, Inc.," and insert -- Tolomatic, Inc., --.

Signed and Sealed this
Third Day of February, 2026

John A. Squires
*Director of the United States Patent and Trademark Office*